United States Patent [19]

Materne et al.

[11] Patent Number: 4,752,303

[45] Date of Patent: Jun. 21, 1988

[54] PROCESS FOR PRODUCING SYNTHESIS GAS BY PARTIAL OXIDATION OF COAL-WATER SUSPENSIONS

[75] Inventors: Winfried Materne, Wetter; Bernard Schleper, Oberhausen; Josef Hibbel, Oberhausen; Volkmar Schmidt, Oberhausen; Bernhard Lieder, Bottrop; Ulrich Gerhardus; Heinrich Scheve, both of Oberhausen, all of Fed. Rep. of Germany

[73] Assignee: Ruhrchemie Aktiengesellschaft, Fed. Rep. of Germany

[21] Appl. No.: 51,185

[22] Filed: May 12, 1987

Related U.S. Application Data

[63] Continuation of Ser. No. 753,350, Jul. 2, 1985, abandoned, which is a continuation of Ser. No. 431,991, Sep. 30, 1982, abandoned.

[30] Foreign Application Priority Data

May 22, 1982 [DE] Fed. Rep. of Germany ....... 3219316

[51] Int. Cl.$^4$ ................................................ C10J 3/46
[52] U.S. Cl. ........................................ 48/202; 48/206; 48/DIG. 7; 239/132.3; 239/417; 252/373
[58] Field of Search ................ 48/197 R, 206, 215, 48/DIG. 7, 202, 86 R; 252/373; 239/8, 132.3, 416, 417, 422, 423

[56] References Cited

U.S. PATENT DOCUMENTS

| | | | |
|---|---|---|---|
| 872,288 | 11/1907 | Koons | 239/132.3 |
| 2,368,178 | 1/1945 | Turpin | 239/417 |
| 2,772,729 | 12/1956 | Mayhew | 239/132.3 |
| 3,241,825 | 3/1966 | Jilek et al. | 239/417 |
| 3,255,966 | 6/1966 | Hoffert et al. | 239/132.3 |
| 3,310,240 | 3/1967 | Grundman | 239/404 |
| 3,364,970 | 1/1968 | Dombruch et al. | 239/422 |
| 3,980,233 | 9/1976 | Simmons et al. | 239/400 |
| 4,173,497 | 11/1979 | Holemann | 239/422 |
| 4,351,647 | 9/1982 | Marion et al. | 48/197 R |
| 4,443,230 | 4/1984 | Stellaccu | 48/147 R |
| 4,455,949 | 6/1984 | Kristschmer et al. | 110/263 |
| 4,502,633 | 3/1985 | Saxon | 48/86 R |

FOREIGN PATENT DOCUMENTS 155010 12/1920 United Kingdom ............... 239/416

Primary Examiner—Peter Kratz
Attorney, Agent, or Firm—Sprung Horn Kramer & Woods

[57] ABSTRACT

The present invention describes a process for producing synthesis gas by partial oxidation of carbon-containing particles suspended in water with oxygen at elevated pressures and temperatures of 1000° to 1600° C. Three substance streams are added separately but simultaneously to the reactor. The inner substance stream consists of oxygen or a mixture of oxygen and synthesis gas. The middle substance stream forms a carbon-water suspension, and the outer substance stream carries oxygen or oxygen-containing gases. Due to the fact that these three substance streams intersect at an acute angle, an ideal distribution of the suspension with the gas streams is achieved and an optimum reaction course is ensured. In order to be able to compensate requirement fluctuations during continuous operation, the outlet opening for the carbon-water suspension and the outer gas stream can be correspondingly adapted in a continuous and independent manner.

6 Claims, 2 Drawing Sheets

PROCESS FOR PRODUCING SYNTHESIS GAS BY PARTIAL OXIDATION OF COAL-WATER SUSPENSIONS

This application is a continuation, of application Ser. No. 753,350, filed July 2, 1985, now abandoned, which is a continuation of Ser. No. 431,991, filed Sept. 30, 1982, now abandoned.

BACKGROUND OF THE INVENTION

1. Field of the Invention

This invention relates to coal gasification. More especially, this invention relates to a process and apparatus for producing synthesis gas by partial oxidation of carbonaceous solids suspended in water.

2. Discussion of Prior Art

German Offenlegungsschrift 23 09 821 describes a burner and a process for producing synthesis gas by partial oxidation of hydrocarbons and slurries of solid, carbon-containing fuels in liquid hydrocarbons. The burner consists of a central, axial tubular gas line joined to two further tubular inlets concentrically arranged relative to this line. In order to carry out the process, oxygen may be added to the reaction via the central axial line, and a hydrocarbon or a slurry of solid hydrocarbon-containing fuels in hydrocarbons via the middle line concentrically surrounding the said dentral feed line.

A temperature-regulating gas is introduced via the outer concentric line. A gas or gas mixture which reacts enothermically in the formation of synthesis gas is used as temperature-regulating gas. Water in the form of droplets or stream, and inert gases such as nitrogen and carbon dioxide are recommended. Steam and carbon dioxide are preferred as the temperature-regulating gas since inert gases have the disadvantage that they merely dilute the reaction product. The purpose of this temperature regulating gas is to effect the reaction temperatures and suppress the back-mixing of already formed synthesis gas in the zone of partial oxidation.

The disadvantage of such process is that the coal-water suspensions are not converted to the desired extent into synthesis gas. It is true that a temperature control is achieved when using an outer inert gas stream, though at the expense of the conversion, with the result that unreacted carbon fractions remain in the gas stream.

SUMMARY OF THE INVENTION

These disadvantages are avoided in the process according to the invention for producing synthesis gas by partial oxidation of carbon-containing particles suspended in water with oxygen in a reaction zone at elevated pressure and a temperature of 1000° to 1600° C., wherein the suspension and oxygen are added separately to the reaction zone. The process is characterized in that a centrically introduced gas (oxygen-containing) stream is surrounded by a coal-water suspension guided concentrically around the said gas stream, and a further oxygen-containing outer gas stream is led, guided concentrically around this suspension stream, to the reaction zone.

It has proven advantageous to add 1 to 20% by weight of the total required amount of $O_2$ via the inner gas stream, and to introduce the remaining amount of oxygen via the outer gas stream.

In a special embodiment of the process according to the invention, 1 to 19% by weight of synthesis gas referred to the total amount of oxygen required is added to the inner gas stream, which contains in total 20% of the gas referred to the total amount of oxygen required. The residual gas amount is oxygen.

The coal-water suspension, which forms the middle substance stream, is added at a velocity of 1 to 25m/sec. to the reactor, which is under a pressure of 10 to 200 bars. In general it is recommended to add the coal-water suspension to the reaction zone at a velocity of 5 to 15 m/sec., whereas the inner and outer gas streams reach the reaction zone at a velocity of 50 to 300 m/sec., preferably 80 to 200 m/sec. The three concentric guide lines, in which the two gas streams and the coal-water suspension are led separately but simultaneously, are conically tapered at their end facing the reaction zone. The tangential elongation of the inner surface of one of each conical tapering produces with the central axis a point of intersection which simultaneously forms the apex of an imaginary cone. The less the conical tapering, the smaller the angle which the tangent to the inner surface of the tube forms with the central axis. The cone is correspondingly acute. The greater the degree of conical tapering, the greater the angle of intersection between the tangent to the inner surface and the central axis.

It is recommended to choose a relatively small angle of 0° to 15° referred to the central axis, for the conical tapering of the inner gas stream, whereas the angle for the coal-water suspension surrounding the inner gas stream should be 5° to 40° relative to the central axis, and the angle for the outer gas stream should be 10° to 85°, likewise relative to the central axis.

By suitably combining the conical taperings, the flow direction of the coal-water suspension forms an angle of 5° to 30° with the flow direction of the inner gas stream, and the flow direction of the outer gas stream forms an angle of 5° to 50° with the flow direction of the coal-water suspension.

This means that the suspension flow in the vicinity of the end of the conical tapering is forced apart and broken up by the inner gas stream. The suspension stream thus experiences a horizontal deflection and does not pass in free fall through the reaction zone. The average residence time of the individual coal-water droplets is thus increased and as a result an improved conversion is achieved.

At the same time the outer gas stream meets the suspension stream that has been "expanded" by the inner gas stream and produces an additional mixing of gas and suspension, so that a zone of uniform distribution of gas or oxygen and very fine suspension droplets is produced. This is an essential prerequisite for achieving as high a degree of conversion of the suspension as possible. This is further assisted by the different entry velocity of the coal-water suspension on the one hand, and the gas streams on the other hand. One can also feed the inner gas stream to the reaction zone at a higher velocity than the outer gas stream and vice versa. In general the inlet velocity of the gas stream is considerably higher than that of the coal-water suspension.

BRIEF DESCRIPTION OF DRAWINGS

As demonstration tests show, a zone resembling the shape of a tulip including a short stem is produced immediately at the end of the conical taperings, i.e. at the burner mouth.

Figure 1:
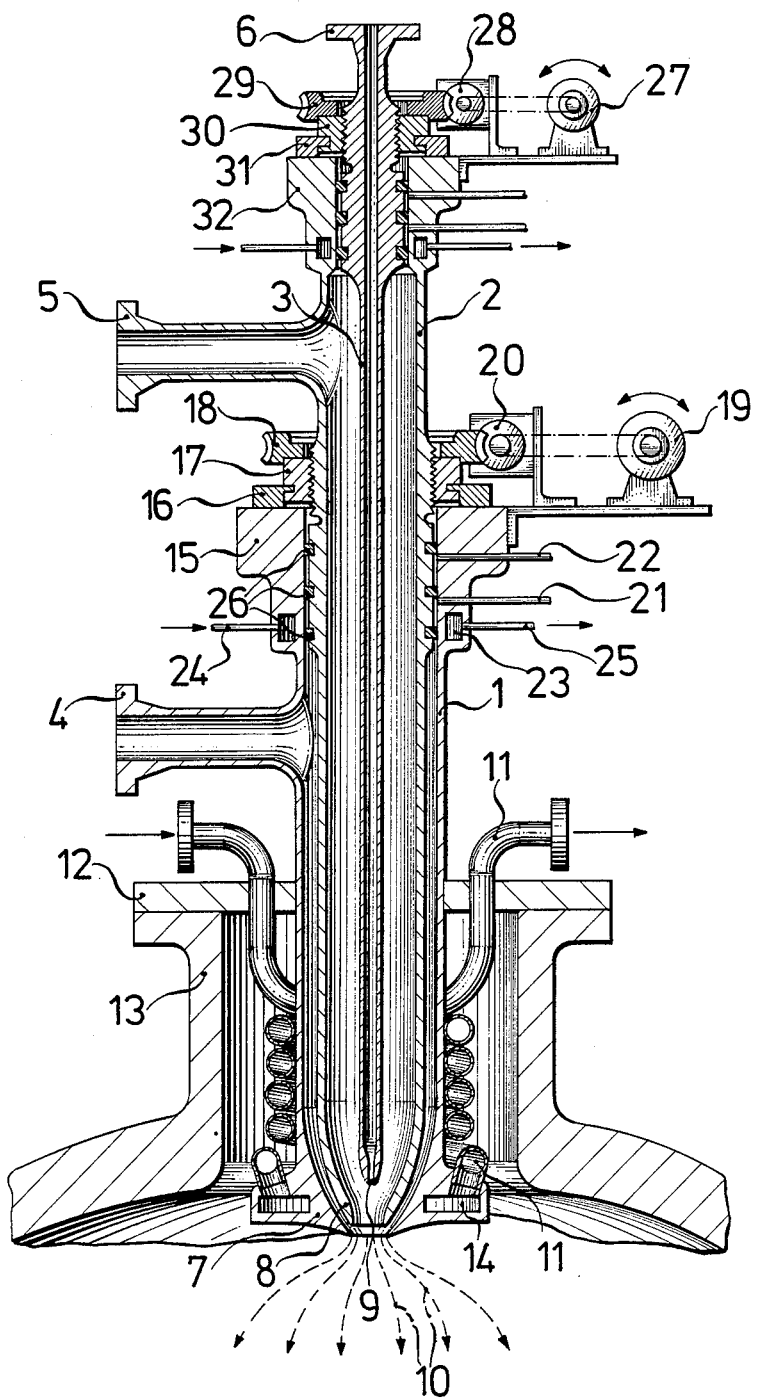
FIGS. 1 and 2 which are longitudinal sectional views of an apparatus according to the invention. Lines 10 show the paths of individual droplets.

In a modern coal gasification plant, which operates for commercial reasons in conjunction with neighboring consumers such as chemical plants of power-stations, problems of adaptation to the respective requirements of the consumers inevitably arise. This means that frequently a rapid change in the throughput in the coal gasification plant is necessary in order to cover peak demands during power production. Care, therefore, has to be taken to ensure that the amounts of coal-water suspension and gas or oxygen that are used are continuously adjusted to the respective increased or reduced demands. At the same time, however, even temporary shutdowns of the coal gasification plant must be avoided, e.g. by the use of a suitably dimensioned burner. Even a brief shutdown will produce an unallowable cooling of the reactor and thus tive rise to problems when restarting the gasification process, since the brickwork must be so hot that the initiation of the chemical reaction between water and coal is ensured.

This is achieved according to the invention by a continuous enlargement or reduction in the free outlet openings of the coal-water suspension and of the outer gas stream.

The middle tube, which guides the coal-water suspension through the annular gap formed with the inner tube, is not rigidly connected to the inner tube, and the inner tube can be displaced relative to the middle tube in the direction of the cnetral axis.

The middle tube can also be continuously displaced independently of the adjustability of the inner tube, which is rigidly arranged relative to the outer tube.

If the middle tube is displaced in the direction of its outlet opening, the annular gap between the inside of the outer tube and the outside of the middle tube starts to reduce uniformly. Since, however, the size of this annular gap affects the amount of the outer gas stream, a reduction in the annular gap is thus accompanied by a reduction in the gas throughput, and an enlargement of the annular gap is accompanied by an increase in the amount of gas and the gasification process can thus be adapted according to practical operational requirements without having to interrupt the gasification process.

The same is true, independently of the aforedescribed change in the outer annular gap, for the annular gap through which the coal-water suspension exits. A displacement of the inner tube in the direction of its outlet opening, i.e. parallel to the central axis, reduces the annular gap formed between the inside of the middle tube and the outside of the inner tube. A retraction of the inner tube widens the free annular gap and thus increases the consumption of coal-water suspension.

Any necessary adaption of the amount of gas supplied via the inner tube can be controlled by raising or lowering the gas pressure. Raising the gas pressure produces, at constant pressure in the gasification process, an increase in the gas amount, while lowering the gas pressure reduces the inner gas stream.

In this way it is possible to adapt the gasification process within wide limits to the respective requirements of synthesis gas consumers without having to interrupt the process.

DESCRIPTION OF SPECIFIC EMBODIMENT

Figure 2:
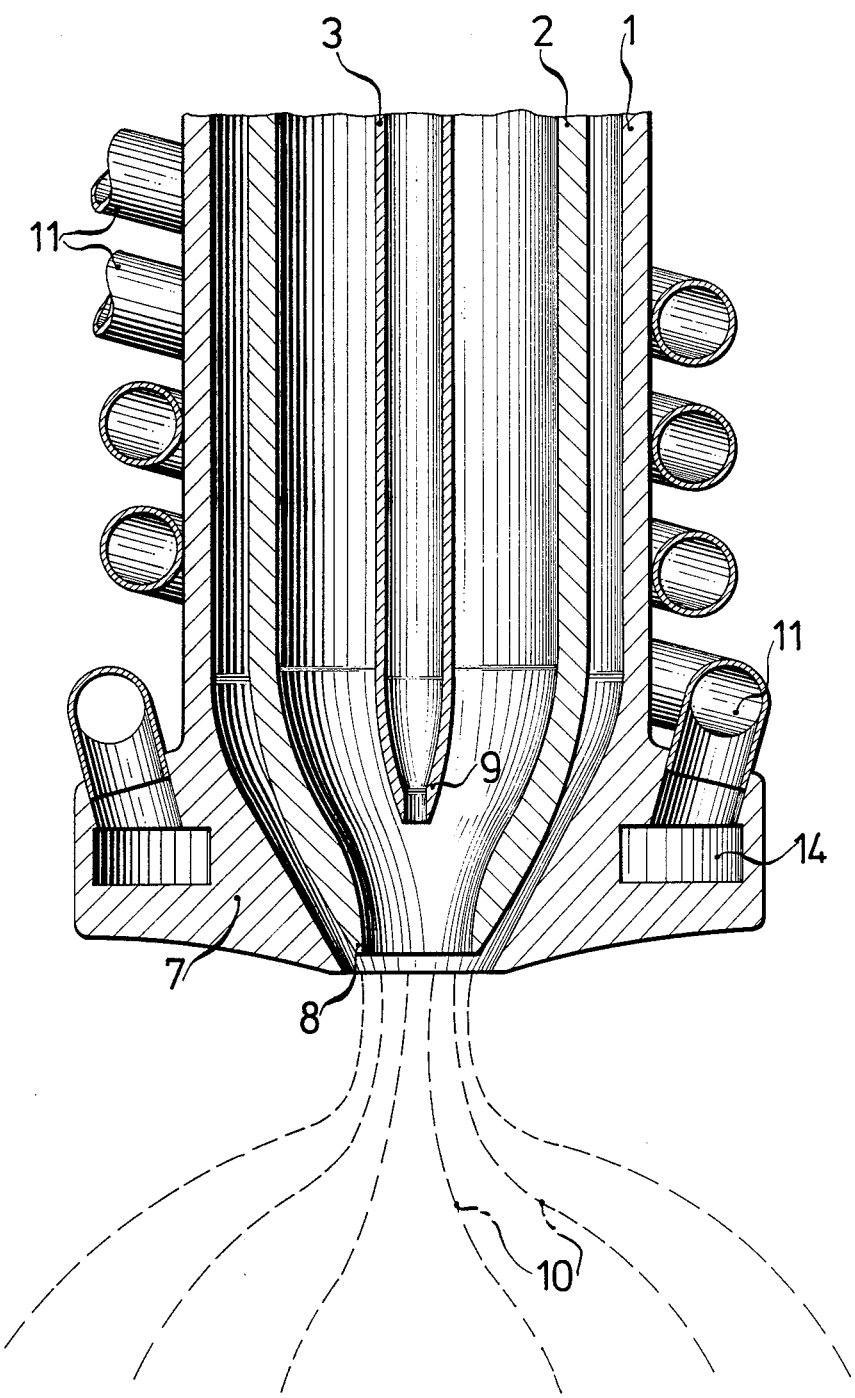

The apparatus required for carrying out the process according to the invention is illustrated in FIGS. 1 and 2. The process will be described hereinafter with the aid of these figures:

The three substance streams, which are under pressure, are fed by means of three, concentrically arranged tubes. An outer tube 1 serves to supply the outer substance stream, consisting of pure oxygen or an oxygen-containing gas mixture. A middle tube 2 is inserted into the outer tube 1, the outside of the former constituting the inner boundary of the outer gas stream. The middle tube 2 serves to supply coal-water suspension. An inner tube 3, which feeds the inner gas stream to the reaction, is inserted in the middle tube 2.

The outer gas stream is fed via a connection pipe 4 provided with a flange, which is mounted on the outer tube. The coal-water suspension is fed to the middle tube 2 via a connection pipe 5 provided with a flange, and the inner gas stream is fed to the inner tube 3 via an opening 6 provided with a connection pipe.

The outer tube 1 has a conical tapering 7. A conical tapering 8 is formed at the end of the middle tube, and the end of the inner tube 3 is likewise formed into a conical tapering 9. The shapes and arrangement of the conical taperings 7, 8 and 9, constitute the burner types. The angle of constriction and the interspacing of the three nozzle ends determine the angle of the three substance streams with respect to one another and affect the course of the combustion process within the reaction zone 10.

In addition, the amounts of the three substance streams and the distribution thereof amoung the three feed paths as well as the relative velocities of the substance streams determine the course of the conversion.

Since the burner nozzles, i.e. the conical taperings 7, 8 and 9, are not only exposed to high thermal stress on account of their vicinity to the reaction zone, but are also subjected to substantial abrasion, they are made from heat resistant and wear-resistant material. In addition, it is recommended to design the conical taperings in a reinforced form. This is achieved by increasing the wall thickness, e.g. by applying the afore-mentioned wear-resistant material to the surface to be reinforced.

In order to reduce the thermal stress at the burner tip, the outer tube 1 is provided with a line 11 which passes a cooling agent such as water or steam through a flange 12 mounted on the outer tube 1. The flange 12 serves mechanically to secure the burner to the reactor 13. The line 11 coils around the outer tube 1 and enters a cooling channel 14 located in the conical tapering 7. A further component piece of the line 11 is attached to the cooling channel 14 and serves to transport the cooling agent away. This component piece is likewise coiled around the outer tube and exits through the flange 12.

The outer tube 1 has a reinforcement 15 above the connection pipe 4, with a fixed retaining ring 16 which accommodates a rotatable threaded nut 17. The threaded nut 17 is for its part connected to a worm wheel 18. This worm wheel 18 is moved by a servomotor 19, which has a chain drive and a worm shaft 20. Power is transmitted from the servomotor 19 via the chain to the worm shaft 20, which in turn transmits the power taken up to the worm wheel 18.

In this way one can, during, the implementation of the process according to the invention, axially displace the position of the middle tube 2 to the outer tube 1 via the counterthread at the part 17 connected to said tube 2. By retracting the middle tube 2 with respect to the outer tube 1, the nozzle opening formed by the conical taperings 7 and 8 is widened. With an enlarged nozzle opening it is possible to increase the throughput of the substance stream.

Conversely, a displacement of the middle tube 2 with respect to the outer tube 1 reduces the nozzle opening formed by the conical taperings. By reducing the nozzle opening one can reduce appropriately the throughput of the substance stream.

The reinforcement 15 comprises one or more bores 21 and 22. The bore 22 is a test bore used to check the hermeticity of the arrangement. The bore 21 constitutes a connection for a sealing chamber, not illustrated here. The purpose of the sealing chamber is to prevent the outlet of the pure oxygen or oxygen mixture under pressure.

A cooling device is also arranged at the lower end of the reinforcement 15, which is formed by a cooling channel 23 tobether with a feed line 24 for the coolant, and an outlet line 25.

The middle tube 2 has a solidly formed widening at the height of the reinforcement 15. This widening fully occupies the free cross-section of the outer tube 1. A plurality of grooves 26 intended to accommodate sealing rings is provided in the outside of this widening.

The inner tube 3 can be adjusted relative to the middle tube 2 by means of a fixed retaining ring 31, and with the aid of a, as previously described, similarly arranged mechanism which moves, with the aid of a servomotor 27 via a chain drive at a worm shaft 28, a worm wheel 29 and a threaded nut 30 connected to the said worm shaft. The widening 32 corresponds to the flange 15, but is, however, dimensioned corresponding to the dimensions of the middle tube and inner tube.

The cross-section of the nozzle opening formed by the conical taperings 8 and 9 is altered by displacing the inner tube 3 relative to the middle tube 2. The displacement and retraction of the inner tube 3, in addition to effecting an adaptation to the throughput, effects the atomization of the reaction mixture and thus the conversion.

In this way one can adapt the burner device to the respective requirements during continuous operation. If the consumption of synthesis gas is low, if e.g., a connected gas turbine in a power-station is operated only under normal load, the, middle tube 2 and the inner tube 3 are appropriately displaced. If on the other hand, an increased production of synthesis gas is required, the annular gap can be increased by retracting the two tubes 2 and 3, and the substance throughput can be increased within wide limits. This flexible adaptation to operating requirements is important, especially for a combined method of coal gasification for operating a power-station, since the respective gas requirements of the power-station can be covered without interrupting the gas production. The existing requirements of continuous operation can thus be taken into account at all times with the aid of the apparatus according to the invention.

A further advantage of the process and apparatus according to the invention is that a coal gasification plant can be started up. During this start-up, the initially cold brickwork of the reactor is heated to temperatures of 1000 to 1500° C. and the coal gasification, i.e. the conversion of coal with water to form synthesis gas, is then carried out. Only when the brickwork has become suitably hot can the endothermic synthesis gas production be carried out.

In order to heat up the brickwork, instead of the coal-water suspension, for example light oil gasoline or hydrogen is reacted with oxygen. The heat thus produced heats up the reactor brickwork and the process according to the invention is then implemented to gasify, for example, a coal-water suspension.

Hitherto it was necessary to heat up the brickwork by means of a special burner in a separate step, and then dismantle this burner as soon as the necessary temperature of the brickwork was reached. This complicated procedure is avoided in the present case. The hitherto normal replacement of the burner, i.e. exchanging the burner required for starting up the plant by the burner required for the gasification of the coal-water mixtures, is avoided. Thus, in addition to a saving in time, there is a financial advantage resulting from the saving in dismantling and conversion work.

What is claimed is:

1. In a process for producing synthesis gas by partial oxidation of carbon-containing particles suspended in water with oxygen in a reaction zone at elevated pressure and at a temperature of 1000° to 1600° C., wherein the suspension and oxygen are introduced separately into the reaction zone, the improvement which comprises introducing a first oxygen-containing stream to said reaction zone in the form of a stream concentrically disposed within a circumferentially continuous encircling stream of a coal water suspension which in turn is concentrically disposed within a circumferentially continuous encircling stream of a second oxygen-containing gas, wherein the coal-water suspension is added at a velocity of 1 to 25 meters per second, said first and second oxygen-containing gas streams are independently added each at a velocity of 50 to 300 meters per second, wherein the flow direction of the coal-water suspension is caused to form an angle of 5 to 30 degrees with the flow direction of said first oxygen-containing gas stream and the flow direction of the second oxygen-containing gas stream is caused to form an angle of 5 to 50 degrees with the flow of the coal-water suspension and wherein said first oxygen-containing gas stream contains 1 to 20 percent by weight of the total requirement amount of oxygen and said second oxygen-containing gas stream contains 80 to 99 percent of the total required amount of oxygen.

2. A process according to claim 1, wherein the amount of coal-water suspension or the amount of said second oxygen-containing gas are increased or decreased independently of one another during the gasification process by enlarging or reducing the outlet openings at the end of conduits through which they are passed.

3. A process according to claim 2, wherein the amount of coal-water suspension or the amount of second oxygen-containing gas is increased or decreased continuously during the process.

4. A process according to claim 2, wherein the amount of coal-water suspension is increased or decreased during the process.

5. A process according to claim 2, wherein the amount of said second oxygen-containing gas is increased or decreased during the process.

6. A process according to claim 1, wherein said coal-water suspension is added at a velocity of 5 to 15 meters per second and said first and second oxygen-containing gas streams are each independently added at a velocity of 80 to 200 meters per second to the reaction zone.

* * * * *